Patented Feb. 14, 1933

1,897,133

UNITED STATES PATENT OFFICE

MARTIN LUTHER, OF MANNHEIM, AND HANS BELLER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF MASSES RESEMBLING RUBBER OIL SUBSTITUTE

No Drawing. Application filed June 26, 1929, Serial No. 373,933, and in Germany July 3, 1928.

The present invention relates to the production of masses resembling rubber oil substitute.

We have found that products resembling rubber oil substitute are obtained by treating the mixture of esters prepared by esterifying polyhydric alcohols, such as glycerol or sorbitol, with the unsaturated fatty acids, obtainable by splitting off water from oxidation products of waxes, including paraffin waxes and like hydrocarbons or from the mixture of acids separated therefrom, for example, by distilling the said oxidation products, either by themselves or in admixture with esters of other unsaturated fatty acids, which term includes also esters of hydroxy fatty acids which latter acids can be converted into unsaturated acids by heating, with a sulphurizing agent, such as sulphur or substances containing sulphur, such as sulphur monochloride and the like.

The temperatures applied during the treatment with the said sulphurizing agents depend on the nature and strength of the latter and on whether or not a diluent is employed. Thus, for example, when employing sulphur a temperature of up to 120° C. or even more may be applied, whereas when employing a sulphur chloride a temperature above about 80° C. should not be exceeded. If a diluent be employed the reaction temperature should generally not exceed the boiling point of the diluent chosen, since otherwise costly pressure-tight apparatus are required. As stated above the reaction may also be performed in the presence of an inert diluent, such as hydrocarbons or any derivatives thereof which are free from hydroxyl groups, such as petroleum fractions, carbon disulphide or carbon tetrachloride. This process furnishes particularly valuable products inasmuch as they are free from albuminous substances and the other impurities which are present in rubber oil substitute prepared, for example, from linseed oil or rape seed oil.

The products resembling rubber oil substitute obtained in accordance with the present invention may be employed alone or also in admixture with rubber oil substitutes obtained from the said or similar initial materials of natural origin.

The following example will further illustrate the nature of the said invention, but the invention is not restricted to this example. The parts are by weight.

Example 20 parts of the mixture of unsaturated acid having a saponification value of 261 obtainable by distilling at atmosphere pressure the acid portion insoluble in petroleum ether of an oxidation product of paraffin wax are esterified with 2 parts of glycerol, 10 parts of the ester so obtained being treated with 3 parts of sulphur monochloride in 10 parts of petroleum ether at about 60° C. When the petroleum ether is distilled off there remains a tenacious non-glutinous rubber-like mass having great elasticity.

What we claim is:

1. The process for the production of masses resembling rubber oil substitute, which comprises heating a mixture of esters of polyhydric alcohols with unsaturated acids prepared by splitting off water from the mixture of acids resulting from the oxidation of waxes, in the presence of a sulphurizing agent.

2. The process for the production of masses resembling rubber oil substitute, which comprises heating a mixture of esters of polyhydric alcohols with unsaturated acids prepared by splitting off water from the mixture of acids, resulting from the oxidation of waxes, together with esters of other unsaturated fatty acids in the presence of a sulphurizing agent.

3. The process for the production of masses resembling rubber oil substitute, which comprises heating a mixture of esters of polyhydric alcohols with unsaturated acids prepared by splitting off water from the mixture of acids resulting from the oxidation of waxes, in the presence of a sulphurizing agent and of an inert diluent.

4. The process for the production of masses resembling rubber oil substitute, which comprises heating a mixture of esters of polyhydric alcohols with unsaturated acids prepared by splitting off water from the mixture of acids, resulting from the oxidation of waxes, together with esters of other unsaturated fatty acids in the presence of a sulphurizing agent and of an inert diluent.

5. As new articles of manufacture products resembling rubber oil substitute comprising a polymerized and sulphurized mixture of esters of polyhydric alcohols with the unsaturated acids prepared by splitting off water from the mixture of acids resulting from the oxidation of waxes.

In testimony whereof we have hereunto set our hands.

MARTIN LUTHER.
HANS BELLER.